United States Patent
Eum et al.

(10) Patent No.: US 9,647,564 B2
(45) Date of Patent: May 9, 2017

(54) POWER SUPPLY DEVICE

(71) Applicant: FAIRCHILD KOREA SEMICONDUCTOR LTD., Bucheon-si (KR)

(72) Inventors: Hyun-Chul Eum, Seoul (KR); Young-Jong Kim, Seoul (KR); In-Ki Park, Seoul (KR)

(73) Assignee: Fairchild Korea Semiconductor LTD (KR)

(*) Notice: Subject to any disclaimer, the term of this patent is extended or adjusted under 35 U.S.C. 154(b) by 64 days.

(21) Appl. No.: 14/853,525

(22) Filed: Sep. 14, 2015

(65) Prior Publication Data

US 2016/0006360 A1 Jan. 7, 2016

Related U.S. Application Data

(63) Continuation-in-part of application No. 13/920,448, filed on Jun. 18, 2013.

(60) Provisional application No. 61/662,502, filed on Jun. 21, 2012.

(30) Foreign Application Priority Data

May 29, 2013 (KR) .................. 10-2013-0061247
Nov. 20, 2014 (KR) .................. 10-2014-0162918

(51) Int. Cl.
H05B 33/08 (2006.01)
H02M 3/335 (2006.01)
H02M 1/42 (2007.01)

(52) U.S. Cl.
CPC ..... *H02M 3/33507* (2013.01); *H02M 1/4258* (2013.01); *Y02B 70/126* (2013.01)

(58) Field of Classification Search
None
See application file for complete search history.

(56) References Cited

U.S. PATENT DOCUMENTS

2011/0193494 A1* 8/2011 Gaknoki ............. H02M 1/4258
315/297

* cited by examiner

*Primary Examiner* — Dedei K Hammond
(74) *Attorney, Agent, or Firm* — Grossman Tucker Perreault & Pfleger PLLC

(57) ABSTRACT

A power supply device according to the present invention includes: a filter capacitor coupled to a line to which an input voltage that is passed through a dimmer is supplied; a discharge switch coupled to the filter capacitor through the line; and a main switch receiving the input voltage and controlling power transmission. The power supply device performs input voltage control for shaping the input voltage with a predetermined pattern using the discharge switch.

32 Claims, 10 Drawing Sheets

POWER SUPPLY DEVICE

CROSS-REFERENCE TO RELATED APPLICATION

This application claims priorities to and the benefits of U.S. Patent Application Nos. 61/662,502 and Ser. No. 13/920,448, filed to the USPTO on Jun. 21, 2012, and Jun. 18, 2013, respectively, and the priorities to and the benefits of Korean Patent Application Nos. 10-2013-0061247 and 10-2014-0162918, filed with the Korean Intellectual Property Office on May 29, 2013, and Nov. 20, 2014, respectively, the entire contents of which are incorporated herein by reference.

BACKGROUND (a) Technical Field

Embodiments relate to a power supply device.

(b) Description of the Related Art

A triac dimmer passes each cycle of a sine wave of an AC input by a dimming angle. The AC input is cut by the dimmer, and a period during which an input voltage is not generated occurs.

A power supply device including the dimmer includes a main switch that controls power supply. A conventional power supply device controls the main switch to perform a switching operation even for the period during which no input voltage is generated.

The above information disclosed in this Background section is only for enhancement of understanding of the background of the invention and therefore it may contain information that does not form the prior art that is already known in this country to a person of ordinary skill in the art.

SUMMARY

Embodiments have been made in an effort to provide a power supply device that can control an input voltage.

A power supply device according to an exemplary embodiment includes: a filter capacitor coupled to a line to which an input voltage that is passed through a dimmer is supplied; a discharge switch coupled to the filter capacitor through the line; and a main switch receiving the input voltage and controlling power transmission. The power supply device performs input voltage control for shaping the input voltage with a predetermined pattern using the discharge switch, controls a switching operation of the main switch, and controls at least one of a conduction period of the dimmer and a current flowing to the main switch during the conduction period according to a phase angle of the input voltage.

An input voltage control period during which the input voltage control is performed includes a first period during which the input voltage is cut by the dimmer, and the filter capacitor is discharged by a current flowing to the discharge switch during the first period.

The input voltage control period further includes a second period that overlaps a period during which the input voltage is decreased, and the current flowing to the discharge switch is controlled with a predetermined pattern during the second period.

The current flowing to the discharge switch is increased during the second period, and a slope of the current flowing to the discharge switch may be changed during the second period. The current flowing to the discharge switch may be linearly regulated during the second period. A duty of the discharge switch may be increased during the second period.

The conduction period includes a period from an instant at which the input voltage is generated to an instant at which the peak of the input voltage is generated. The input voltage control period may be generated after a predetermined delay period from a termination instant of the conduction period.

When the dimmer is a trailing edge dimmer, a period during which an input current is generated according to a switching operation of the main switch at least includes a period from a predetermined instant before the peak generation instant of the input voltage to an instant at which the input voltage is cut.

The input voltage control period may include the period during which the input voltage is cut.

The power supply device may further include a conduction period controller provided to enable the switching operation of the main switch during the conduction period.

The conduction period controller may control at least one of the conduction period and a level of an input current that is filtered from the current flowing to the main switch during the conduction period according to the phase angle of the input voltage.

The power supply device further includes a duty determiner comparing a reference voltage corresponding to information on a level of the input current that is filtered from the current flowing to the main switch and a voltage corresponding to the current flowing to the main switch, and controlling the switching operation of the main switch according to a result of the comparison during the conduction period.

The reference voltage may be determined based on a feedback voltage provided for regulation of an output current flowing to a load of the power supply device.

A predetermined input voltage control period includes a period during which a slope of the current flowing to the discharge switch is increased and a period during which the current flowing to the discharge switch is maintained at a constant level.

The predetermined pattern depends on a line voltage input to the dimmer, and the current flowing to the discharge switch may be controlled to control the input voltage to follow the predetermined pattern.

The power supply device further includes an input voltage controller generating a gate voltage supplied to a gate of the discharge switch to shape the input voltage with the predetermined pattern during the input voltage control period.

The input voltage controller includes: a subtractor generating a shaping control voltage according to a difference between an input sense voltage corresponding to the input voltage and a predetermined reference voltage; a clamping circuit clamping the shaping control voltage to a predetermined clamping voltage; and an error amplifier controlling a sense voltage that corresponds to the current flowing to the discharge switch to be equivalent to the shaping control voltage.

A duty of the main switch is controlled for the input voltage control during a non-conduction period of the dimmer.

According to another exemplary embodiment, a power supply device includes: a filter capacitor coupled to a line to which an input voltage passed through a dimmer is supplied; and a main switch receiving the input voltage and controlling power transmission. The power supply device controls a switching operation of the main switch to shape the input voltage with a predetermined pattern during a predetermined input voltage control period, controls a switching operation of the main switch for a conduction period during which the dimmer is in a turn-on state, and controls at least one of the conduction period of the dimmer and a current flowing to the main switch during the conduction period according to a phase angle of the input voltage.

The input voltage control period includes a period during which the current flowing to the main switch is increased while the input voltage is decreased, and a slope of the current flowing to the main switch is changed for the period during which the current flowing to the main switch is increased.

The input voltage control period includes a period during which the current flowing to the main switch is linearly regulated while the input voltage is decreased.

The input voltage control period includes a period during which the duty of the main switch is increased while the input voltage is decreased.

The input voltage control period includes a period during which the filter capacitor is discharged by the current flowing to the main switch for a period during which the input voltage is cut by the dimmer.

The input voltage control period includes a period during which the current flowing to the main switch is increased while the input voltage is decreased.

The power supply device further includes a conduction period controller determining the conduction period and the input voltage control period and controlling at least one of the conduction period and a level of an input current that is filtered from the current flowing to the main switch during the conduction period according to a phase angle of the input voltage.

The power supply device further includes a duty determiner comparing a reference voltage corresponding to information on a level of the input current that is filtered from the current flowing to the main switch and a voltage corresponding to the current flowing to the main switch, and controlling the switching operation of the main switch according to a result of the comparison during the conduction period.

The reference voltage is determined based on a feedback voltage provided for regulation of an output current flowing to a load of the power supply device.

The power supply device further includes an input voltage controller sensing an input current flowing to the main switch and controlling the switching operation of the main switch to control the input current during the input voltage control period.

The predetermined pattern depends on a line voltage input to the dimmer, and the current flowing to the main switch is controlled to control the input voltage to follow the predetermined pattern during the input voltage control period.

The predetermined input voltage control period includes a period during which the current flowing to the main switch is increased and a period during which the current flowing to the main switch is maintained at a constant level.

A power supply device according to another exemplary embodiment includes: a filter capacitor coupled to a line to which an input voltage having passed through a dimmer is supplied; a discharge switch coupled to the filter capacitor through the line; and a main switch receiving the input voltage and controlling power transmission, wherein the power supply device performs input voltage control for shaping the input voltage with a predetermined pattern using the discharge switch and the main switch.

According to the exemplary embodiments, a power supply device that can control an input voltage with a sine wave like a line voltage can be provided.

DETAILED DESCRIPTION OF THE EMBODIMENTS

Figure 1:
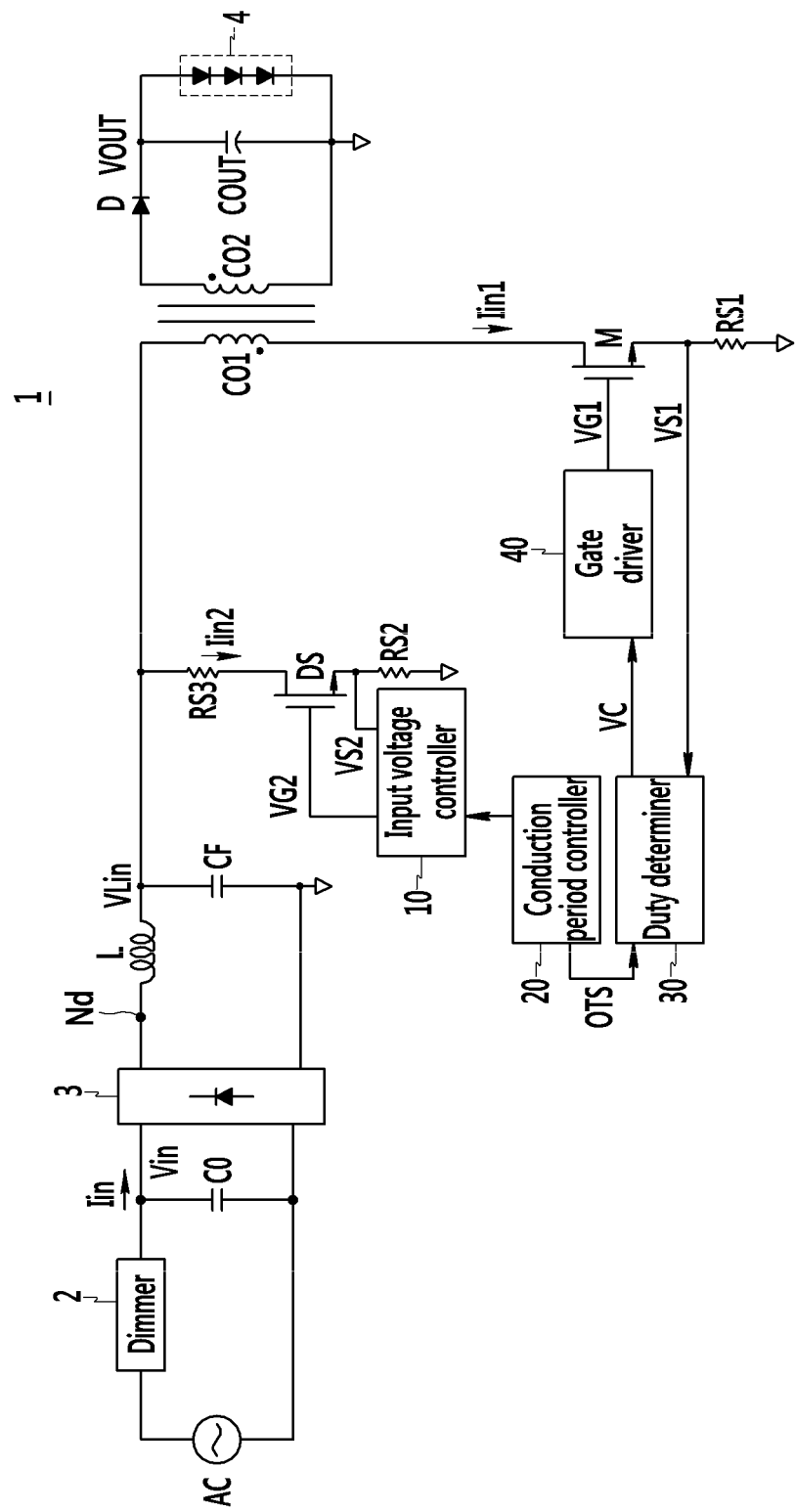
FIG. 1 shows a power supply device according to an exemplary embodiment.

In the following detailed description, only certain exemplary embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Hereinafter, exemplary embodiments will be described with reference to the accompanying drawings.

FIG. 1 shows a power supply device according to an exemplary embodiment.

A power supply device 1 supplies power to a load using an AC input AC. The power supply device 1 according to the exemplary embodiment o includes a switch mode power supply (SMPS). The SMPS supplies power to a load 4 using an input voltage Vin transmitted through a capacitor CO. The SMPS includes a first wire CO1, a second wire CO2, a main switch M, a rectification diode D, and an output capacitor COUT.

The power supply device 1 further includes an input voltage controller 10, a conduction period controller 20, a duty determiner 30, and a gate driver 40. An output end of the power supply device 1 shown in FIG. 1 is connected to the load 4 including a plurality of LED elements connected in series, but the exemplary embodiment of the present invention is not limited thereto.

The AC input AC is passed through a dimmer 2 and thus becomes an input voltage Vin, and an input current Iin flows through the dimmer 2. The AC input AC passing through the dimmer 2 is determined according to a dimming angle of the dimmer 2. For example, as the dimming angle is increased, the AC input AC passing through the dimmer 2 is increased, and when the dimming angle is the maximum, the AC input AC passing through the dimmer 2 becomes the maximum.

The capacitor C0 is connected between an output end of the dimmer 2 and the AC input AC. The input voltage Vin is rectified by a rectification circuit 3. For example, when the rectification circuit 3 is a full-wave rectification circuit, the input voltage Vin is full-wave rectified.

An inductor L and a filter capacitor CF are connected to lateral ends of the rectification circuit 3 and suppress a sudden change in the input voltage Vin. For example, the inductor L prevents a rapid increase of a current in a line where the input voltage Vin is supplied, and the filter capacitor CF reduces a variation range of the input voltage Vin due to a voltage drop generated from the line to which the input voltage Vin is supplied. The filter capacitor CF may also remove a noise of the input voltage Vin. Hereinafter, the functions of the inductor L and the filter capacitor CF will be referred to as input voltage filtering. Hereinafter, the input voltage Vin passed through the rectification circuit 3 will be referred to as a line input voltage VLin, and the input voltage Vin is filtered through the inductor L and the filter capacitor CF.

A first end of the first wire CO1 provided in the primary side is connected to the capacitor CF and receives the line input voltage VLin. A second end of the first wire CO1 is connected to the main switch M. A drain electrode of the main switch M is connected to the second end of the first wire CO1, a first gate voltage VG1 is supplied to a gate electrode of the main switch M to control a switching operation of the main switch M, and a source electrode of the main switch M is connected to a ground through a first resistor RS1.

The second wire CO2 provided in the secondary side is connected to the output capacitor COUT through the rectification diode D, and the rectification diode D includes an anode electrode connected to a first end of the second wire CO2 and a cathode electrode connected to a first end of the output capacitor COUT. The output capacitor COUT is charged by a current passed through the rectification diode D, and maintains an output voltage VOUT.

A discharge switch DS is connected to the filter capacitor CF through a line through which the line input voltage VLin is supplied. The discharge switch DS includes a drain electrode connected to the first end of the filter capacitor CF and the line input voltage VLin through a resistor RS3, a gate electrode connected to the input voltage controller 10, and a source electrode connected to the ground through a resistor RS2.

Heat generated from the discharge switch DS is reduced through the resistor RS3. A second gate voltage VG2 is input to the gate electrode, and the discharge switch DS is turned on by a high-level second gate voltage VG2.

The input voltage controller 10 performs input voltage control for shaping the input voltage with a predetermined pattern using the discharge switch DS. The shaping implies that the input voltage Vin passed through the dimmer 2 is controlled to follow a line voltage. The line voltage is a voltage of the AC input line before passing through the dimmer 2. For example, when the dimmer 2 is turned off, the input voltage Vin is controlled to be similar to the line voltage by the shaping. Hereinafter, a turn-on period of the dimmer 2 is referred to as a conduction period.

In FIG. 1, the discharge switch DS is connected to the line input voltage VLin, but the present invention is not limited thereto. The discharge switch DS is connected to the line input voltage VLin for shaping of the input voltage Vin, and the exemplary embodiment shown in FIG. 1 is not limited thereto. The discharge switch DS may be connected to a node Nd between the rectification circuit 3 and the inductor L.

A period during which the input voltage control is performed is referred to as an input voltage control period, and the input voltage controller 10 generates a second gate voltage VG2 that controls a degree of conduction or switching of the discharge switch DS.

In detail, the input voltage controller 10 senses a second input current Iin2 flowing to the discharge switch DS, and controls the second input current Iin2 with a predetermined reference waveform. The predetermined reference waveform may be appropriately controlled for shaping the input voltage Vin. During the input voltage control period, the second input current Iin2 is controlled by the discharge switch DS, and the input voltage Vin is shaped by the second input current Iin2.

The input voltage controller 10 may receive a second voltage VS2 generated in the second resistor RS2 to sense the second input current Iin2 flowing to the discharge switch DS. For example, the input voltage controller 10 senses the second input current Iin2 using the second voltage VS2, and generates the second gate voltage VG2 to make the second input current Iin2 required for forming the input voltage Vin with a predetermined pattern flow.

The conduction period controller 20 controls the switching operation of the main switch M during the conduction period. The conduction period controller 20 may control a switching duty of the main switch M to make a first input current Iin1 that supplements the second input current Iin2 for the input voltage control flow during a period (e.g., an input voltage control period) other than the conduction period. The first input current Iin1 is a current that is filtered from a current flowing to the main switch M.

For example, the conduction period controller 20 can control the duty determiner 30 such that the main switch M may be operated with a low duty for controlling the input voltage Vin during the input voltage control period.

The conduction period controller 20 may transmit information on the conduction period to the input voltage controller 10. The input voltage controller 10 may set the input voltage control period in consideration of the information on the conduction period.

In addition, the conduction period controller 20 can control at least one of the conduction period and a level of the first input current Iin1 according to a phase angle of the input voltage Vin. The phase angle of the input voltage Vin implies a period during which the input voltage is generated. The conduction period controller 20 can control at least one of the conduction period and the level of the first input current Iin1 according to a change in the phase angle.

In detail, when the phase angle is decreased, the conduction period controller 20 may decrease the level of the first input current Iin1 during the conduction period according to the decreased phase angle, or may reduce the conduction period. On the contrary, when the phase angle is increased, the conduction period controller 20 may increase the level of the first input current Iin1 during the conduction period according to the increased phase angle, or may increase the conduction period.

Figure 2A:
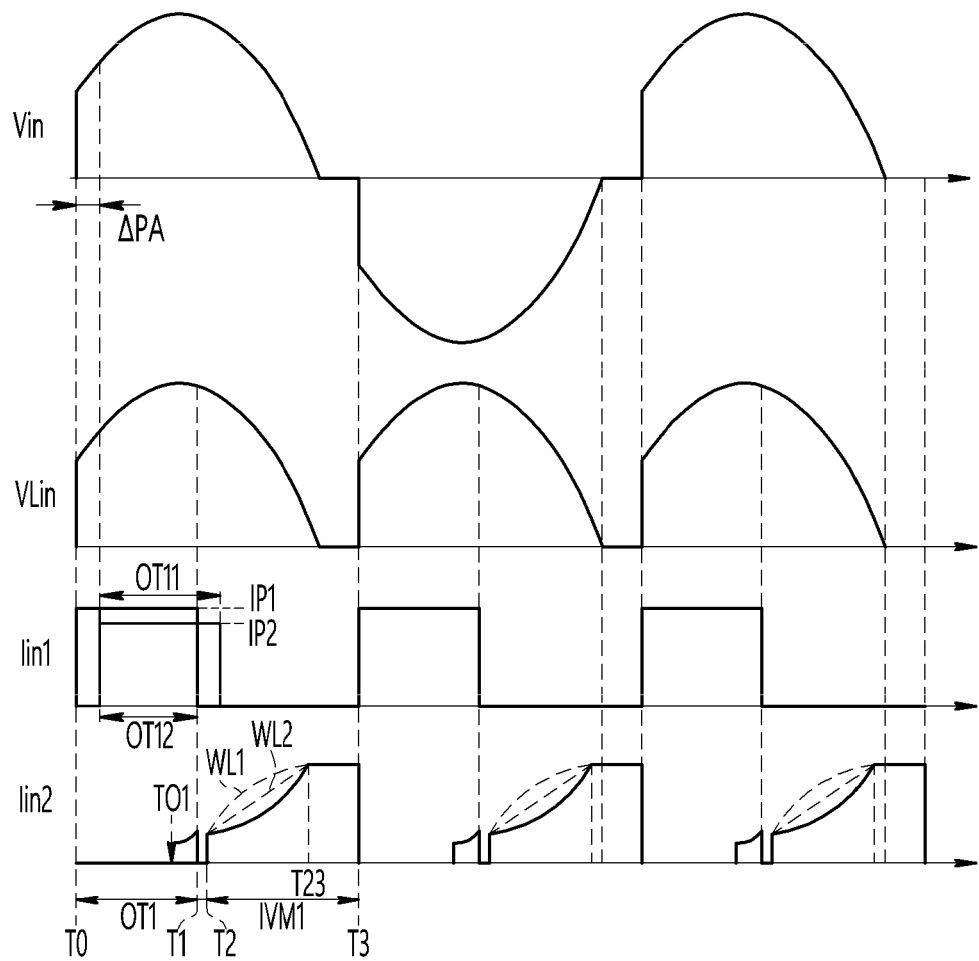
FIG. 2A shows an input voltage, a line input voltage, a first input current, and a second input current according to the exemplary embodiment.

For example, when the phase angle is decreased by ΔPA, the conduction period controller 20 maintains the conduction period with a period OT11 that is equivalent to a period OT1 as shown in FIG. 2A, and reduces the level of the first input current Iin1 to IP2 from IP1. Alternatively, the conduction period controller 20 may reduce the conduction period to OP12 if the dimming angle is reduced by ΔPA. When the conduction period is the period OT11, the input current control period may be delayed for a predetermined time period.

The conduction period controller 20 generates a conduction period control signal OPS including information on the conduction period and the level of the first input current Iin1 and transmits the conduction period control signal OTs to the duty determiner 30.

The duty determiner 30 generates the first input current Iin1 flowing to the main switch M, and generates a gate control signal VC that controls the switching operation of the main switch M based on the conduction period control signal OTS. The duty determiner 30 may receive a first voltage VS1 generated in the first resistor RS1 to sense the first input current Iin1.

The duty determiner 30 generates the gate control signal VC for power transmission during the conduction period based on the conduction period control signal OTS. In addition, the duty determiner 30 can control the switching operation of the main switch M according to the information on the level of the first input current Iin1 based on the conduction period control signal OTS and the first voltage VS1.

For example, the duty determiner 30 may generate the gate control signal VC according to a result of comparison between a reference voltage corresponding to the information on the level of the first input current Iin1 and the first voltage VS1 corresponding to the current flowing to the main switch M.

Alternatively, a reference voltage that determines the level of the first input current Iin1 may be generated based on a feedback voltage provided for regulation of a current flowing to an LED string (load) 4. For example, the feedback voltage can be generated according to a result of comparison between the current flowing to the LED string 4 and a predetermined output reference voltage. The duty determiner 30 may generate the gate control signal VC according to a result of the comparison between the reference voltage determined based on the feedback voltage and the first voltage VS1.

The duty determiner 30 may generate the gate control signal VC that controls the switch duty such that the first input current Iin1 that supplements the second input current Iin2 may flow for the input voltage control during the period other than the conduction period.

The gate driver 40 generates the first gate voltage VG1 according to the gate control signal VC during the conduction period.

While the main switch M is turned on by the first gate voltage VG1, the first input current Iin1 is increased with a slope that depends on the line input voltage VLin such that energy is stored in the first wire CO1 in the primary side. When the main switch M is turned off, the diode D is conductive. Then, the energy stored in the first wire CO1 is transmitted to the second wire CO2 in the secondary side, and a current flowing to the second wire CO2 is supplied to the output capacitor COUT or the load 4 through the diode D. As described, the main switch M serves to control power transmission of the power supply device 1.

FIG. 2A shows the input voltage, the line input voltage, the first input current, and the second input current according to the exemplary embodiment of the present invention.

As shown in FIG. 2A, the line input voltage VLin follows a waveform of a full-wave rectified input voltage Vin.

The waveform of the first input current Iin1 shown in FIG. 2A represents a level of the first input current Iin1 generated for every switching cycle of the main switch M.

As shown in FIG. 2A, a conduction period OT1 and an input voltage control period IVM1 exist in every cycle of the line input voltage VLin. For example, the conduction period OT1 is set to include a period from T0 at which the input voltage Vin is generated to T1 at which the peak of the input voltage Vin is passed. The input voltage control period IVM1 is set to include a period from T2 delayed for a predetermined time period from T1 to T3 at which the input voltage Vin is generated again.

In FIG. 2A, the conduction period OP1 and the input voltage control period IVM1 do not overlap each other, but the present invention is not limited thereto, and thus the conduction period and the input voltage control period may partially overlap.

For example, the input voltage control period may further include a period from a random instant between T0 to T1 (e.g., T01 of FIG. 2A) to T1. Then, the second input current Iin2 can supplement the first input current Iin1 that may be insufficient during the conduction period OT1.

During the conduction period OT1, the switching operation of the main switch M is enabled, and therefore the first input current Iin1 is generated with a constant level. After termination of the conduction period OT1, the dimmer 2 is turned off if no current flows to the main switch M. In addition, during the input voltage control period IVM1, the second input current Iin2 is slowly increased and then maintained with a constant level at T23. Then, the input voltage Vin is shaped with the pattern shown in FIG. 2A. In FIG. 2A, T23 may be an instant before the input voltage Vin reaches zero voltage.

The input voltage controller 10 can control the second input current Iin2 to increase slowly through the second voltage VS2. For example, the second input current Iin2 is increased with an increasing waveform of which the slope is increasing so that the input voltage Vin may be shaped as shown in FIG. 2A. The input voltage controller 10 may generate the second gate voltage VG2 that controls the second input current Iin2 with the waveform shown in FIG. 2A during the input voltage control period IVM1.

However, the exemplary embodiment is not limited thereto, and the second input current Iin2 can be generated with any one of WL1 and WL2 marked by dotted lines for shaping of the input voltage Vin.

Figure 2B:
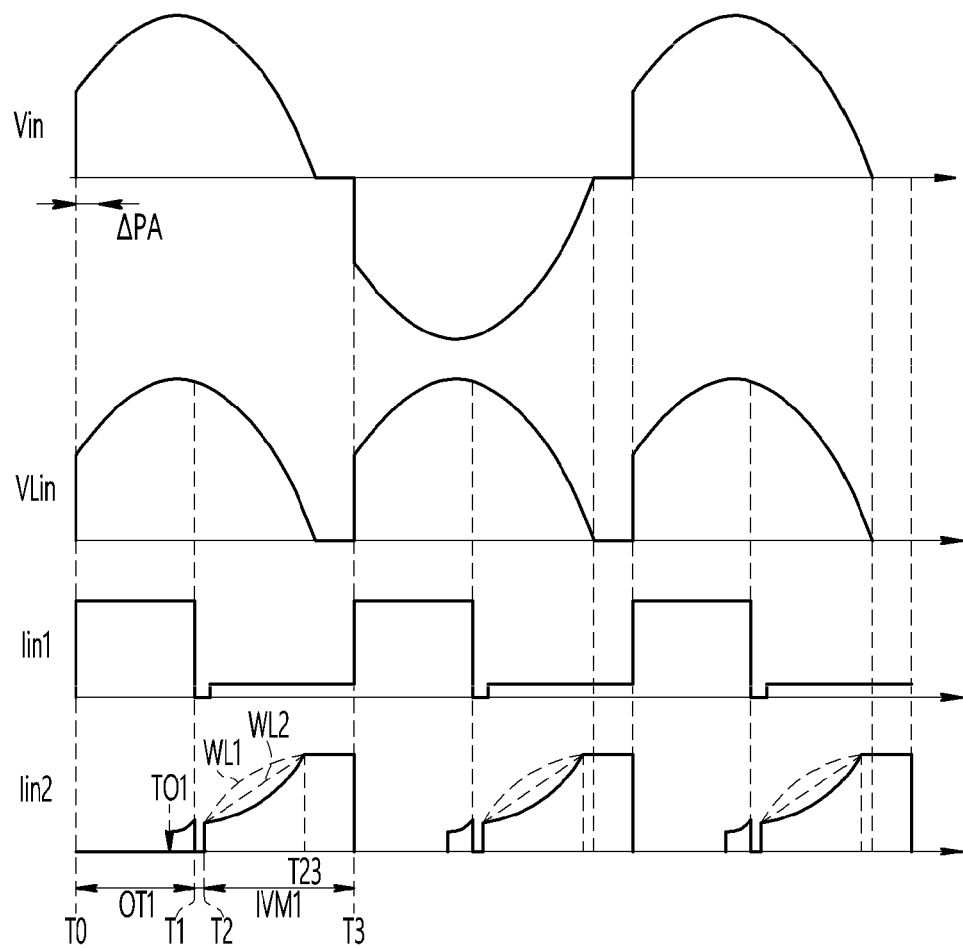
FIG. 2B is a waveform with which the first input current is generated during an input voltage control period.

FIG. 2B shows a waveform with which the first input current is generated during the input voltage control period.

As previously stated, the switching duty of the main switch M may be controlled to make the first input current Iin1 that compensates for the second input current Iin2 flow for the input voltage control.

Any description that overlaps the description relates to FIG. 2A will not be provided. As shown in FIG. 2B, the main switch M is controlled with a predetermined duty during the input voltage control period IVM1 so that the first input current Iin1 may be generated. In this case, the predetermined duty is appropriately controlled according to an amount that is required for the input voltage control.

As described, the input voltage can be controlled using the discharge switch DS and the main switch M in the exemplary embodiment. The waveform of the first input current Iin1 and the waveform of the second input current Iin2 are controlled for shaping the input voltage, and the switching operation (i.e., at least one of switching frequency and duty)

of the discharge switch DS and the main switch M is controlled to generate the first input current Iin1 and the second input current Iin2.

Figure 3:
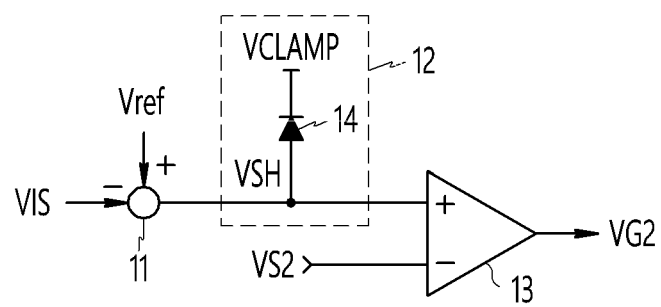
FIG. 3 shows an input voltage controller according to the exemplary embodiment.

FIG. 3 shows the input voltage controller according to the exemplary embodiment.

The input voltage controller 10 shown in FIG. 3 includes a subtractor 11, a clamping circuit 12, and an error amplifier 13.

The subtractor 11 subtracts an input sense voltage VIS that corresponds to the input voltage Vin from a reference voltage Vref to generate a shaping control voltage VSH. The input sense voltage VIS can be acquired by resistance-dividing the input voltage Vin, or may be acquired by using a voltage generated in an auxiliary wire that is coupled to the wire in the primary side. Alternatively, the input sense voltage VIS may be acquired by a voltage that is internally mapped without regard to the input voltage Vin.

The clamping circuit 12 clamps the shaping control voltage VSH to a clamping voltage VCLAMP when the shaping control voltage VSH is higher than the clamping voltage VCLAMP. For example, the clamping circuit 12 includes a diode 14, the shaping control voltage VSH is connected to an anode of the diode 14, and the clamping voltage VCLAMP is connected to a cathode of the diode 14. When the shaping control voltage VSH is higher than the clamping voltage VCLAMP, the diode 14 is conductive and thus the shaping control voltage VSH is clamped to the clamping voltage VCLAMP. The clamping circuit 12 according to the exemplary embodiment can be implemented with various methods, and in the present exemplary embodiment, the diode 14 is an example of the various methods.

The error amplifier 13 generates a second gate voltage VG2, which is an output voltage, to make a sense voltage VS2 equal the shaping control voltage VSH. The shaping control voltage VSH is input to a non-inversion terminal (+) of the error amplifier 13, and the sense voltage VS2 is input to an inversion terminal (−) of the error amplifier 13.

The shaping control voltage VSH is increased during a period T2 to T23 while the input voltage Vin is decreased, and the shaping control voltage VSH is clamped to the clamping voltage VCLAMP during a period T23 to T3 after the shaping control voltage VSH reaches the clamping voltage VCLAMP. Then, the second gate voltage VG2 is generated according to the shaping control voltage VSH.

For example, the second gate voltage VG2 may be generated as shown in FIG. 4.

Figure 4A:
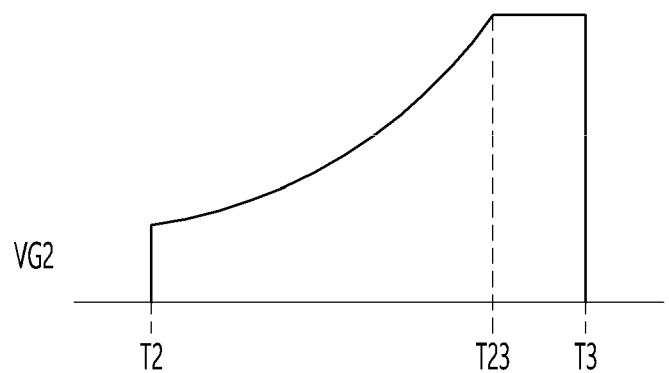
FIG. 4A and FIG. 4B are waveforms of a second gate voltage during the input voltage control period.

FIG. 4A is a waveform representing the second gate voltage during the input voltage control period.

As shown in FIG. 4A, the second gate voltage VG2 is increased with an increasing slope for a period T2 to T23 during which the shaping control voltage VSH is increased, and the second gate voltage VG2 may have a waveform that is maintained with a constant level for a period T23 to T3 during which the shaping control voltage VSH is clamped.

The waveform of the second gate voltage VG2 is described as a increasing waveform, but the present invention is not limited thereto. The waveform may be a waveform that increases a switching duty.

Figure 4B:
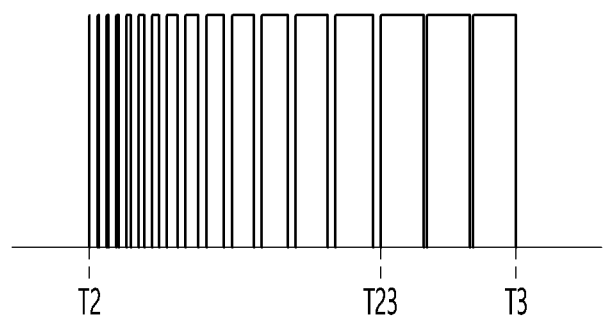

FIG. 4B is a waveform of the second gate voltage during the input voltage control period.

As shown in FIG. 4B, the duty of the second gate voltage VG2 is increased for a period T2 to T23 during which the shaping control voltage VSH is increased, and the duty of the second gate voltage VG2 becomes higher than the duty during the period T2 to T23 and is maintained for a period T23 to T3 during which the shaping control voltage VSH is clamped such that the second input current Iin2 can be maintained with a constant level.

The waveform of the second gate voltage VG2 during the period T23 to T3 is not limited to the waveform shown in FIG. 4B. The second gate voltage VG2 may be maintained with an on-level during the period T23 to T3 to maintain the second input current Iin2 with a constant level.

As previously stated, the second input current Iin2 can be controlled with any one of the dot-lined waveform WL1 and the dot-lined waveform WL2 in FIG. 2A.

For example, in order to shape the input voltage Vin, the second input current Iin2 may have the waveform WL1 that increases with a sine wave during the period T2 to T23. Alternatively, in order to shape the input voltage Vin, the second input current Iin2 may have the waveform WL2 that is linearly regulated and thus linearly increased.

As described, the increasing waveform of the second input current Iin2 in a period during which the input voltage is decreased may be controlled with a pattern for shaping the input voltage Vin.

The first input current Iin1 flowing to the main switch M is blocked and thus the dimmer 2 is turned off. Unless the input voltage Vin is controlled during off period of the dimmer 2, the input voltage Vin at the turn-off instant of the dimmer 2 is maintained. This is an abnormal operation In the exemplary embodiment, the switching operation of the main switch M is enabled during the conduction period OP1 for the period during which the input voltage Vin is generated. However, the second input current Iin2 may flow to supplement the first input current Iin1 during the conduction period OT1.

In the input voltage control period, the main switch M may be enabled with a predetermined duty. As previous described with reference to FIG. 2B, the main switch M may perform the switching operation with a low duty in order to supplement a current for the input voltage control even for a period during which the switching operation of the main switch M needs to be disabled.

As previously stated, a period during which the conduction period control and the input voltage control are simultaneously performed may be generated. However, although the two controls are simultaneously performed, the input current Iin may be lower than a holding current to turn off the dimmer 2. The holding current is the minimum current for maintaining turn-on of the dimmer 2.

For example, as shown in FIG. 2A, no input voltage control is performed during a predetermined period T1 to T2 from the termination instant T1 of the conduction period and thus neither the first input current Iin1 nor the second input current Iin2 flow, and accordingly, the dimmer 2 may be turned off.

Alternatively, although at least one of the operation control and the input voltage control is performed, the sum of the first and second input currents Iin1 and Iin2 is lower than the holding current, and accordingly the dimmer 2 may be turned off.

Figure 5:
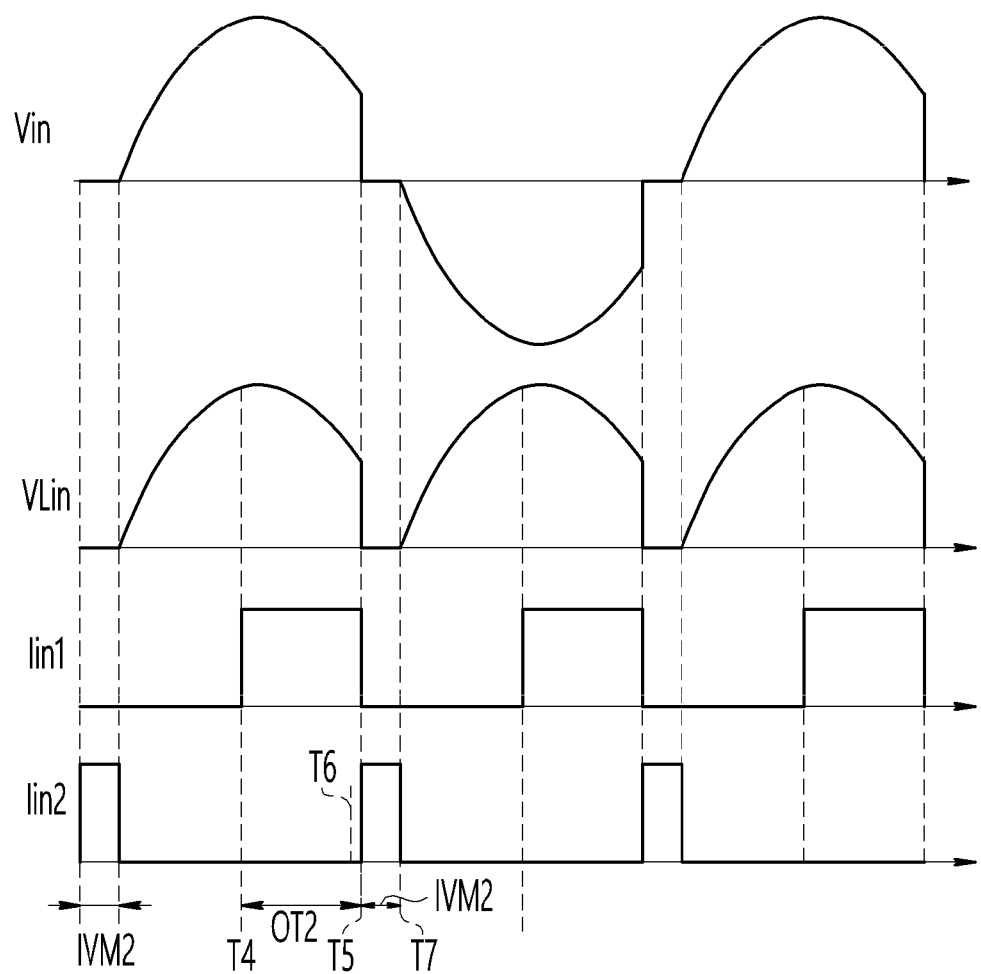
FIG. 5 is a waveform diagram of an input voltage, a line input voltage, a first input current, and a second input current that are different from those in FIG. 2 according to the exemplary embodiment.

FIG. 5 is a waveform diagram of an input voltage, a line input voltage, a first input current, and a second input current that are different from those in FIG. 2 according to the exemplary embodiment of the present invention.

As shown in FIG. 5, a conduction period OT2 is set to include a period from T4, to which the input voltage Vin reaches its peak and to T5 when the input voltage Vin is cut by the dimmer 2, and an input voltage control period IVM2 is set to include a period from T5 to T7, at which the input voltage Vin is generated again.

However, the present invention is not limited thereto, and the input voltage control period IVM2 may overlap the conduction period OT2. For example, the input voltage control may be started from T6.

The input voltage is maintained with zero voltage by the second input current Iin2 flowing to the discharge switch DS during the input voltage control period IVM2. During the conduction period OT2, the first input current Iin1 is maintained with a constant level.

Instead of the capacitor C0 of the power supply device 1 shown in FIG. 1, a bleeder circuit may be connected.

Figure 6:
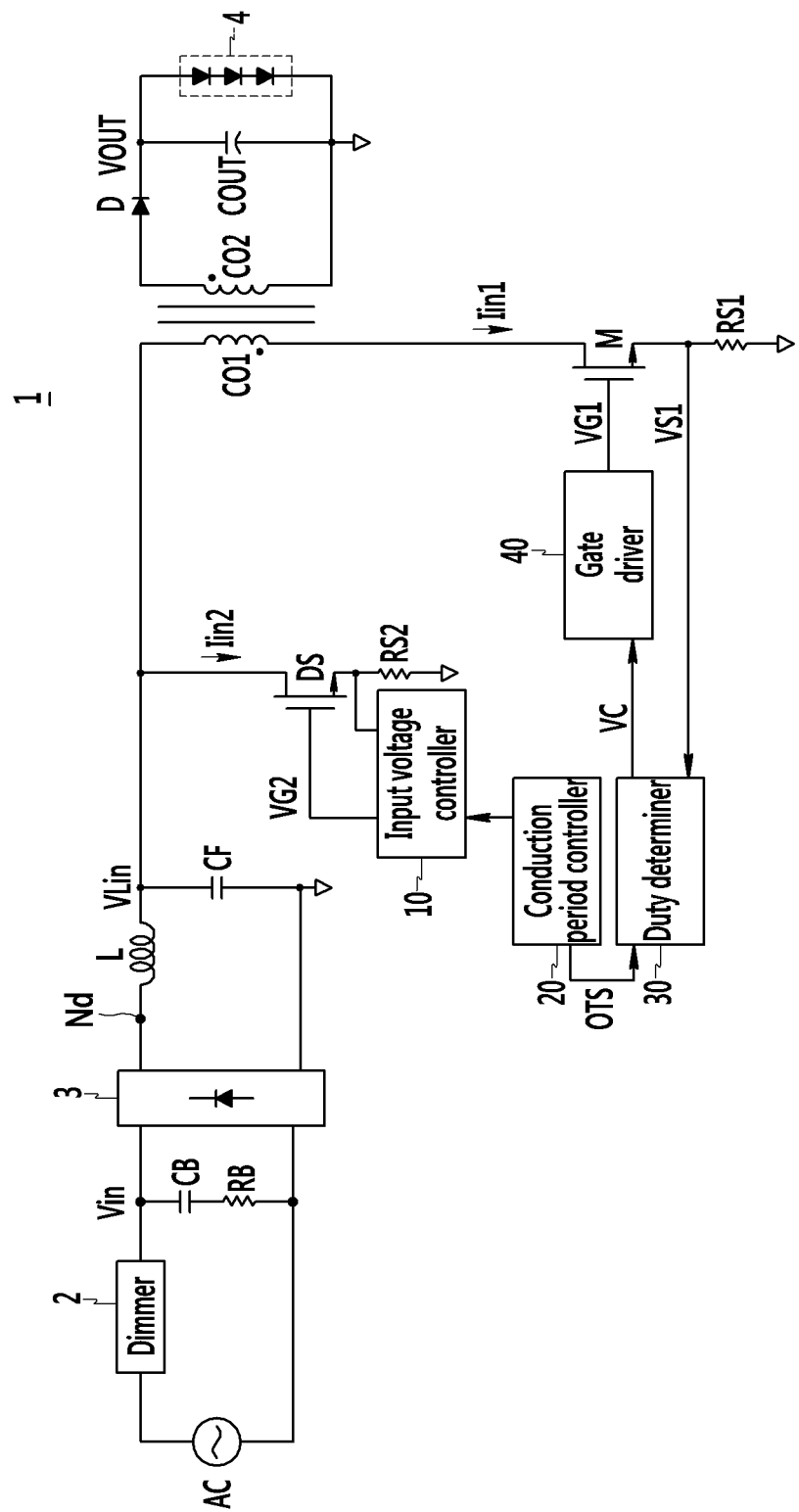
FIG. 6 shows a power supply device according to another exemplary embodiment.

FIG. 6 shows a power supply device according to another exemplary embodiment of the present invention.

Compared to FIG. 1, instead of the capacitor C0, a bleeder circuit including a capacitor CB and a resistor RB that are connected in series may be connected between an input voltage Vin and a primary-side ground. Except for the above-stated difference, other configurations and operations of the power supply device of the present exemplary embodiment are the same as those of the power supply device of FIG. 1.

The power supply device according to the present exemplary embodiment may not include an additional discharge switch for controlling an input voltage.

Figure 7:
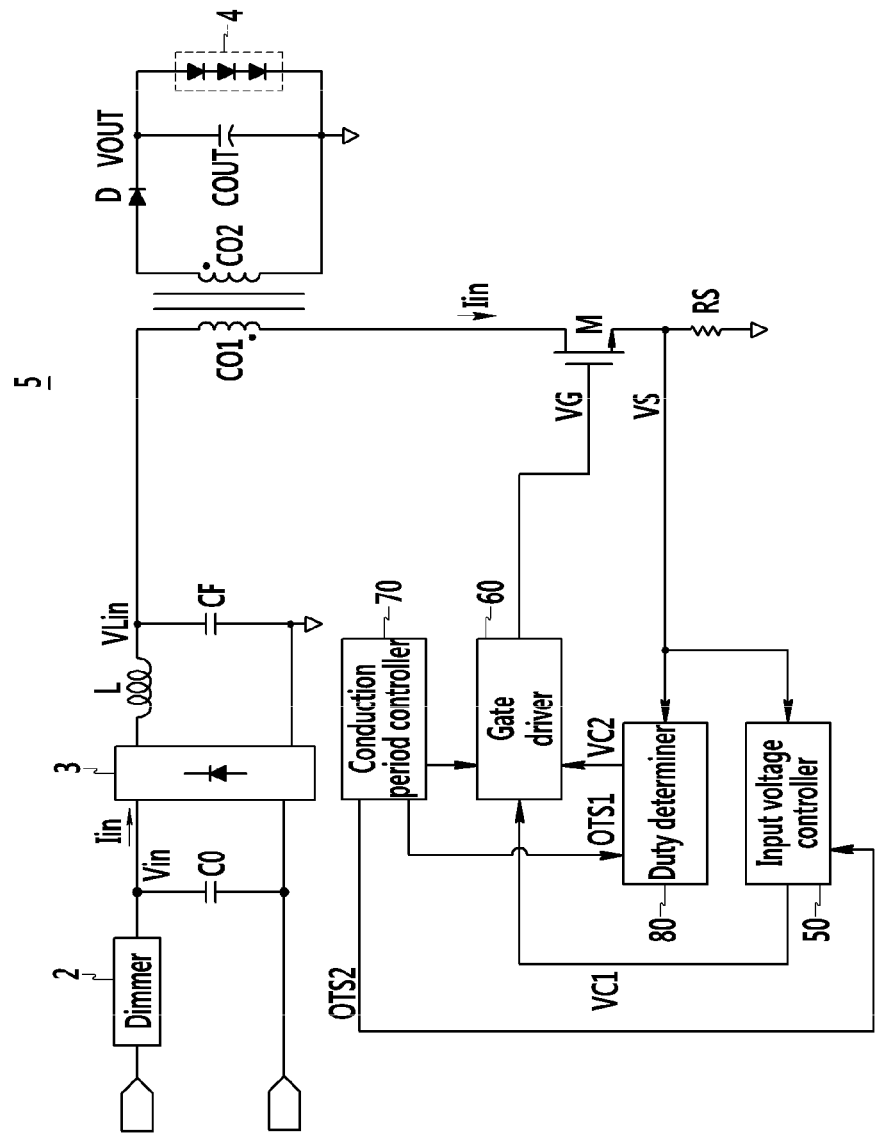
FIG. 7 shows a power supply device according to another exemplary embodiment.

FIG. 7 shows a power supply device according to another exemplary embodiment of the present invention.

Compared to the above-stated exemplary embodiment, like reference numerals designate like elements in the following exemplary embodiment, and a determined description thereof will not be repeated. In FIG. 7, a capacitor C0 is connected between an input voltage Vin and a primary-side ground, but as previously stated, bleeder circuits (CB and RB in FIG. 6) may be connected instead of the capacitor C0.

A power supply device 5 includes an input voltage controller 50, a conduction period controller 70, a duty determiner 80, and a gate driver 60.

The conduction period controller 70 controls the input voltage controller 50 and the duty determiner 30 to be respectively operated in a conduction period during which a main switch M is operated for power supply and an input voltage period for input voltage control.

The conduction period controller 70 may control at least one of a conduction period and a level of an input current Iin according to a change in a phase angle of the input voltage Vin. In detail, when the phase angle is decreased, the conduction period controller 70 reduces a level of the input current Iin of the conduction period according to the reduced phase angle, or may reduce the conduction period. On the contrary, when the phase angle is increased, the conduction period controller 20 may increase the level of the input current Iin of the conduction period according to the increased phase angle, or may increase the conduction period. A detailed example related thereto is the same as the previous exemplary embodiment, and thus no detailed description will be provided.

The conduction period controller 20 generates a first conduction period control signal OTS1 including information on the conduction period and the level of the input current Iin and transmits the first conduction period control signal OTS1 to the duty determiner 80. The conduction period controller 70 generates a second conduction period control signal OTS2 including information on the input voltage control period, and transmits the second conduction period control signal OTS2 to the input voltage controller 50.

The input voltage controller 50 senses an input current Iin during the input voltage control period based on the second conduction period control signal OTS2, and controls the input current Iin during the input voltage control period. For example, the input voltage controller 50 generates a first gate control signal VC1 that controls a switching operation of the main switch M during the input voltage control period using a voltage VS3 that is generated in a resistor RS by the input current Iin. The input voltage controller 50 generates the first gate control signal VC1 for generating a gate voltage VG having a level for shaping the input voltage Vin with a predetermined pattern during the input voltage control period.

The input voltage controller 50 may receive the voltage VS3 generated in the resistor RS to sense the input current Iin flowing to the main switch M. For example, the input voltage controller 50 senses the input current Iin using the voltage VS3, and generates the first gate control signal VC1 to make the input current Iin required for forming the input voltage Vin with a predetermined pattern.

The duty determiner 80 senses the input current Iin flowing to the main switch M and generates the first gate control signal VC1 that controls a switching operation based on the first conduction period control signal OTS1. The duty determiner 80 may receive a voltage VS for sensing the input current Iin.

The duty determiner 80 generates a second gate control signal VC2 during the conduction period instructed by the first conduction period control signal OTS1. In addition, the duty determiner 80 may control the switching operation of the main switch M according to information on the level of the input current Iin instructed by the first conduction period control signal OTS1 and the voltage VS.

For example, the duty determiner 80 may generate the gate control signal VC according to a result of comparison between a reference voltage that corresponds to the information on the level of the input current Iin and the voltage VS that corresponds to a current flowing to the main switch M.

Alternatively, a reference voltage that determines the level of the input current Iin may be generated based on a feedback voltage that is provided for regulation of a current flowing to an LED string (load) 4. For example, the feedback voltage may be generated according to a result of comparison between the current flowing to the LED string 4 and a predetermined output reference voltage. The duty determiner 80 may generate the gate control signal VC according to a result of comparison between the reference voltage determined based on the feedback voltage and the voltage VS.

The gate driver 60 generates a gate voltage VG according to the first gate control signal VC1 during the input voltage control period, and generates the gate voltage VG according to the second gate control signal VC2 during the conduction period. The gate driver 60 determines the input voltage control period and the conduction period according to a signal supplied from the conduction period controller 70.

Hereinafter, an operation of a power supply device according to another exemplary embodiment of the present invention will be described with reference to FIG. 8.

Figure 8:
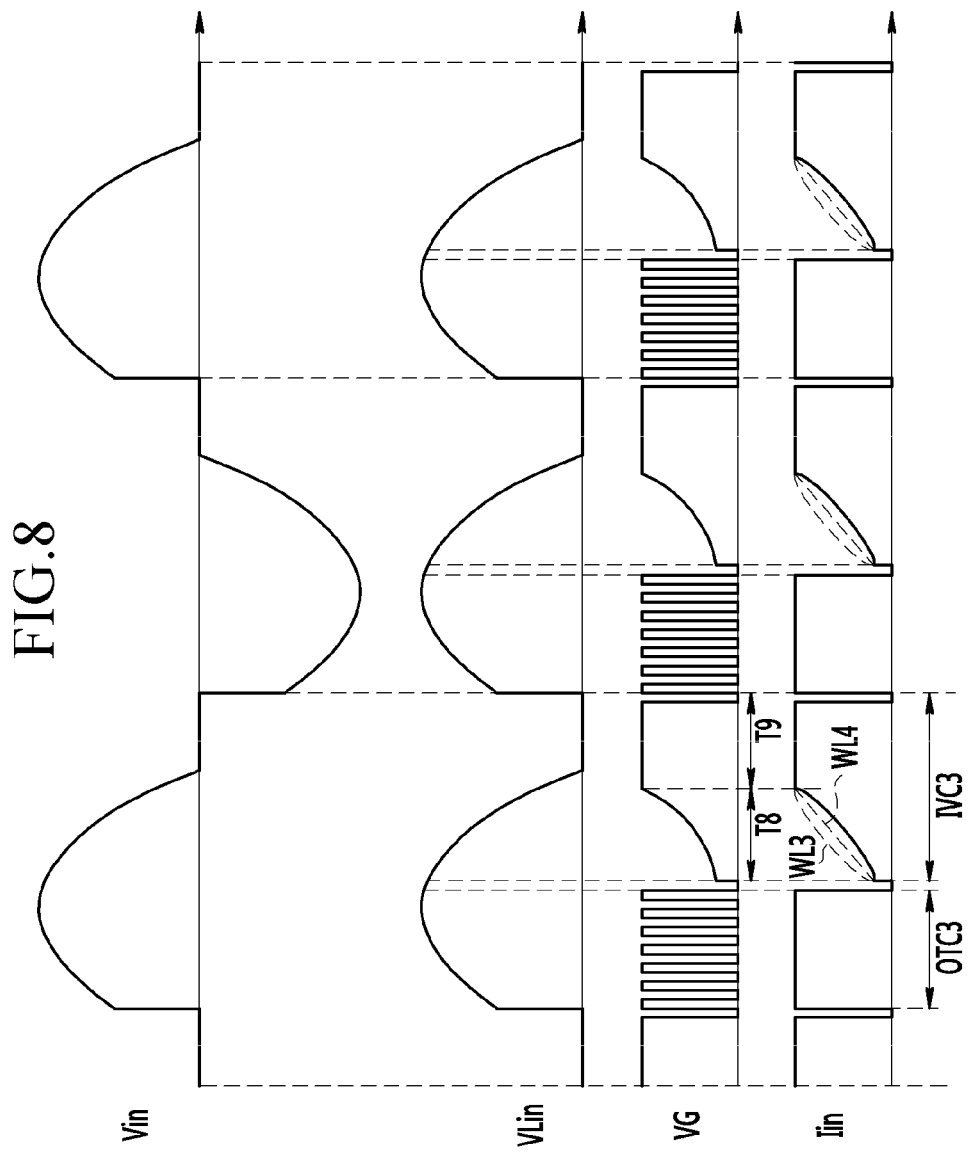
FIG. 8 shows an input voltage, a gate voltage, and an input current according to the other exemplary embodiment.

FIG. 8 shows an input voltage, a gate voltage, and an input current according to the current exemplary embodiment of the present invention.

During a conduction period OTC3, a gate voltage VG is generated as a pulse signal for controlling a switching operation of a main switch M according to a second gate control signal VC2. An input current Iin is maintained with a constant level during the conduction period OTC3.

An input voltage control period IVC3 starts after a predetermined delay period from termination of the conduction period OTC3. As previously described, the predetermined delay period in FIG. 8 is provided for generating an input current that is lower than a holding current, and the present invention is not limited thereto. That is, although the two periods overlap, a dimmer 2 may be turned off if the input current Iin is lower than the holding current.

During an input voltage control period IVC3, the gate voltage VG is generated to control the input current Iin according to the first gate control signal VC1.

For example, as shown in FIG. 8, during T8, the input current Iin is increased with a waveform of which a slope of the input current Iin is increased such that the input voltage Vin can be shaped. In this case, the input voltage controller 50 generates the first gate control signal VC1 that controls the input current Iin with the waveform shown in FIG. 8 during T8 of the input voltage control period IVC3. The gate driver 60 may generate the gate voltage VG of which a slope is increased as shown in FIG. 8 according to the first gate control signal VC1.

During T9, the gate voltage VG is maintained with a constant level and the input current Iin is also maintained with a constant level.

However, the present invention is not limited thereto, and the input current Iin may be controlled with a waveform that is different from the gate voltage VG shown in FIG. 8.

Figure 9:
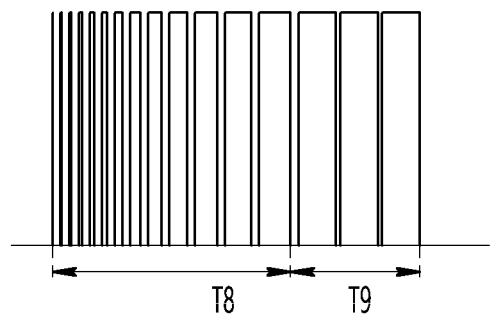
FIG. 9 is a waveform diagram of the gate voltage according to the other exemplary embodiment.

FIG. 9 is a waveform of the gate voltage according to the current exemplary embodiment of the present invention.

As shown in FIG. 9, a duty of the gate voltage VG is increased during T8, and the gate voltage VG may be controlled with a duty that is constant during T9.

In FIG. 8, the input current Iin is increased with a waveform of which a slope of the input current Iin is increased during T8, but the present invention is not limited thereto. The input current Iin may have a waveform that is increased with a sine wave shown in FIG. 8 during T8. Alternatively, for shaping of the input voltage Vin, the input current Iin linearly is regulated and thus is linearly increased during T8.

According to the above-described exemplary embodiments, the input voltage control operation can be performed. For example, according to the exemplary embodiments of the present invention, the input voltage is shaped to follow the waveform of the line voltage input to the dimmer. As described, according to the exemplary embodiments of the present invention, a power supply device that can control a switch conduction period of a main switch and an input voltage control period can be provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 1, 5: power supply device
2: dimmer
3: rectification circuit
DS: discharge switch
CF: filter capacitor
10, 50: input voltage controller
20, 70: conduction period controller
30: duty determiner
40, 60: gate driver
COUT: output capacitor
M: power switch
CO1: first wire
CO2: second wire
D: rectification diode
RS: resistor

What is claimed is:

1. A power supply device comprising:
a filter capacitor coupled to a line configured to receive an input voltage from a dimmer;
a discharge switch coupled to the filter capacitor through the line; and
a main switch configured to receive the input voltage and control power transmission,
wherein the power supply device is configured to perform input voltage control for shaping the input voltage with a predetermined pattern using the discharge switch, control a switching operation of the main switch, and control at least one of a conduction period of the dimmer and a current flowing to the main switch during the conduction period according to a phase angle of the input voltage.

2. The power supply device of claim 1, wherein an input voltage control period during which the input voltage control is performed comprises a first period during which the input voltage is cut by the dimmer and the filter capacitor is discharged by a current flowing to the discharge switch during the first period.

3. The power supply device of claim 2, wherein the input voltage control period further comprises a second period that overlaps a period during which the input voltage is decreased and during which the current flowing to the discharge switch is controlled with a predetermined pattern.

4. The power supply device of claim 3, wherein during the second period the current flowing to the discharge switch is increased and a slope of the current flowing to the discharge switch is changed.

5. The power supply device of claim 4, wherein during the second period a duty of the discharge switch is increased.

6. The power supply device of claim 3, wherein during the second period the current flowing to the discharge switch is linearly regulated.

7. The power supply device of claim 1, wherein the conduction period comprises a period from an instant at which the input voltage is generated to an instant at which a peak of the input voltage is generated.

8. The power supply device of claim 7, wherein an input voltage control period is started after a predetermined delay period from a termination instant of the conduction period.

9. The power supply of claim 1, wherein, when the dimmer is a trailing edge dimmer,
a period during which an input current is generated according to a switching operation of the main switch at least comprises a period from a predetermined instant before a peak generation instant of the input voltage to an instant at which the input voltage is cut.

10. The power supply device of claim 9, wherein an input voltage control period comprises the period during which the input voltage is cut.

11. The power supply device of claim 1, further comprising a conduction period controller configured to enable the switching operation of the main switch during the conduction period.

12. The power supply device of claim 11, wherein during the conduction period the conduction period controller is configured to control at least one of the conduction period and a level of an input current that is filtered from the current flowing to the main switch according to the phase angle of the input voltage.

13. The power supply device of claim 11, further comprising a duty determiner configured to compare a reference voltage corresponding to information on a level of the input current that is filtered from the current flowing to the main switch and a voltage corresponding to the current flowing to the main switch, and to control the switching operation of the main switch according to a result of the comparison during the conduction period.

14. The power supply device of claim 13, wherein the reference voltage is determined based on a feedback voltage provided for regulation of an output current flowing to a load of the power supply device.

15. The power supply device of claim 1, wherein a predetermined input voltage control period comprises a period during which a slope of the current flowing to the discharge switch is increased and a period during which the current flowing to the discharge switch is maintained at a constant level.

16. The power supply device of claim 1, wherein the predetermined pattern depends on a line voltage input to the dimmer, and a current flowing to the discharge switch is controlled to control the input voltage to follow the predetermined pattern.

17. The power supply device of claim 1, further comprising an input voltage controller configured to generate a gate voltage supplied to a gate of the discharge switch to shape the input voltage with the predetermined pattern during an input voltage control period.

18. The power supply device of claim 17, wherein the input voltage controller comprises:
   a subtractor configured to generate a shaping control voltage according to a difference between an input sense voltage corresponding to the input voltage and a predetermined reference voltage;
   a clamping circuit configured to clamp the shaping control voltage to a predetermined clamping voltage; and
   an error amplifier configured to control a sense voltage that corresponds to the current flowing to the discharge switch to be equivalent to the shaping control voltage.

19. The power supply device of claim 1, wherein a duty of the main switch is controlled for the input voltage control during a non-conduction period of the dimmer.

20. A power supply device comprising:
   a filter capacitor coupled to a line to receive an input voltage from a dimmer; and
   a main switch configured to receive the input voltage and to control power transmission,
   wherein the power supply device is configured to control a switching operation of the main switch to shape the input voltage with a predetermined pattern during a predetermined input voltage control period, to control a switching operation of the main switch for a conduction period during which the dimmer is in a turn-on state, and to control at least one of the conduction period of the dimmer and a current flowing to the main switch during the conduction period according to a phase angle of the input voltage.

21. The power supply device of claim 20, wherein the input voltage control period comprises a period during which the current flowing to the main switch is increased, the input voltage is decreased and a slope of the current flowing to the main switch is changed.

22. The power supply device of claim 21, wherein the input voltage control period comprises a period during which the duty of the main switch is increased while the input voltage is decreased.

23. The power supply device of claim 20, wherein the input voltage control period comprises a period during which the current flowing to the main switch is linearly regulated while the input voltage is decreased.

24. The power supply device of claim 20, wherein the input voltage control period comprises a period during which the filter capacitor is discharged by the current flowing to the main switch for a period during which the input voltage is cut by the dimmer.

25. The power supply device of claim 20, wherein the input voltage control period comprises a period during which the current flowing to the main switch is increased while the input voltage is decreased.

26. The power supply device of claim 20, further comprising a conduction period controller configured to determine the conduction period and the input voltage control period and to control at least one of the conduction period and a level of an input current that is filtered from the current flowing to the main switch during the conduction period according to a phase angle of the input voltage.

27. The power supply device of claim 20, further comprising a duty determiner configured to compare a voltage corresponding to the current flowing to the main switch to a reference voltage corresponding to information on a level of an input current that is filtered from the current flowing to the main switch, and to control the switching operation of the main switch according to a result of the comparison during the conduction period.

28. The power supply device of claim 27, wherein the reference voltage is determined based on a feedback voltage provided for regulation of an output current flowing to a load of the power supply device.

29. The power supply device of claim 20, further comprising an input voltage controller configured to sense an input current flowing to the main switch and to control the switching operation of the main switch to control the input current during the input voltage control period.

30. The power supply device of claim 20, wherein the predetermined pattern depends on a line voltage input to the dimmer, and
   the current flowing to the main switch is controlled to control the input voltage to follow the predetermined pattern during the input voltage control period.

31. The power supply device of claim 20, wherein the predetermined input voltage control period comprises a period during which the current flowing to the main switch is increased and a period during which the current flowing to the main switch is maintained at a constant level.

32. A power supply device comprising:
   a filter capacitor coupled to a line configured to receive an input voltage from a dimmer;
   a discharge switch coupled to the filter capacitor through the line; and
   a main switch configured to receive the input voltage and control power transmission,
   wherein the power supply device is configured to perform input voltage control for shaping the input voltage with a predetermined pattern using the discharge switch and the main switch.

* * * * *